United States Patent
Yoshihara et al.

(10) Patent No.: US 6,780,514 B2
(45) Date of Patent: Aug. 24, 2004

(54) OPTICAL COMMUNICATION DEVICE SUBSTRATE AND OPTICAL COMMUNICATION DEVICE

(75) Inventors: Satoru Yoshihara, Kusatsu (JP); Takahiro Matano, Shiga (JP); Akihiko Sakamoto, Shiga (JP); Mitsuo Asai, Annaka (JP); Hitoshi Uehara, Matsuida-machi (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 63 days.

(21) Appl. No.: 10/212,763

(22) Filed: Aug. 7, 2002

(65) Prior Publication Data

US 2003/0103754 A1 Jun. 5, 2003

(30) Foreign Application Priority Data

Aug. 7, 2001 (JP) .................................... 2001-239242
Jan. 22, 2002 (JP) .................................... 2002-012764

(51) Int. Cl.$^7$ .................... B32B 17/06; B32B 25/20; G02B 6/00
(52) U.S. Cl. .................. 428/429; 428/210; 428/304.4; 428/307.3; 428/312.6; 428/447; 428/448; 385/14; 385/37; 385/131; 385/137; 385/141
(58) Field of Search ............. 428/210, 304.4, 428/307.3, 447, 312.6, 429, 448; 385/14, 37, 131, 137, 141

(56) References Cited

U.S. PATENT DOCUMENTS

| 4,683,320 | A | * | 7/1987 | Hida et al. .................... 556/453 |
| 5,405,655 | A | * | 4/1995 | Blum et al. ................... 427/387 |
| 5,420,222 | A | * | 5/1995 | Stepp et al. ................... 528/31 |
| 5,761,367 | A | * | 6/1998 | Matsumoto ................ 385/128 |
| 6,011,886 | A | * | 1/2000 | Abramov et al. ............. 385/37 |
| 6,078,709 | A | * | 6/2000 | Abramov et al. ............. 385/37 |
| 6,087,280 | A | * | 7/2000 | Beall et al. .................... 501/7 |
| 6,387,454 | B1 | * | 5/2002 | Crook et al. ............. 427/407.1 |

FOREIGN PATENT DOCUMENTS

| EP | 0 235 486 A1 | 9/1987 |
| EP | 1 118 884 A1 | 7/2001 |
| EP | 1 174 398 A1 | 1/2002 |
| JP | 7-244207 | 9/1995 |
| JP | 2774038 | 4/1998 |
| JP | 10-227930 | 8/1998 |
| JP | 2000-111748 | 4/2000 |
| JP | 2000-327372 | 11/2000 |
| JP | 2001-205747 | 7/2001 |

* cited by examiner

*Primary Examiner*—Jeffrey B. Robertson
(74) *Attorney, Agent, or Firm*—Arent Fox PLLC

(57) ABSTRACT

An optical communication device substrate made of ceramic or glass-ceramic having a negative thermal expansion coefficient in the range of $-10$ to $-120 \times 10^{-7}/°$ C. in a temperature range of $-40$ to $100°$ C., treated with a solution containing at least one organic silicon compound selected from the group consisting of siloxane compounds and silazane compounds.

9 Claims, 2 Drawing Sheets

OPTICAL COMMUNICATION DEVICE SUBSTRATE AND OPTICAL COMMUNICATION DEVICE

BACKGROUND OF THE INVENTION

1. Field of the Invention

The present invention relates to an optical communication device substrate having a negative thermal expansion coefficient and an optical communication device obtained by fixing an optical component having a positive thermal expansion coefficient onto the substrate.

2. Related Art

A network using an optical fiber has been rapidly improved in company with progress in optical communication technology. In the network, there has been used a wavelength multiplexing technique transmitting light with plural wavelengths collectively, so that a wavelength filter, a coupler, a waveguide and so on become important optical communication devices.

Among such optical communication devices, some have a trouble in outdoor use due to a change in characteristic according to a temperature; therefore a necessity has arisen for a technique to sustain a characteristic of such an optical communication device at a constant level regardless of a change in temperature, so-called athermal technique.

A fiber Bragg grating (hereinafter referred to as FBG) is exemplified as a representative of optical communication devices requiring athermalization. An FBG is an optical communication device having a portion with a profile of a changed refractive index in the form of a grating, so-called grating region, in a core of an optical fiber, and features reflection of light with a specific wavelength according to a relationship given by the following formula (1). For this reason, this has drawn attention as an important optical communication device in a wavelength division multiplex transmission optical communication system in which optical signals with different wavelengths are multiplex-transmitted through a single optical fiber.

$$\lambda = 2n\Lambda \quad \text{(Formula 1)}$$

wherein $\lambda$ is a reflection wavelength, n is an effective refractive index in a core, and $\Lambda$ is a spacing in a region with a changed refractive index in the form of a grating.

Such an FBG has a problem, however, that a center reflective wavelength fluctuates as temperature varies. A temperature dependency of a center reflective wavelength is given by the following formula (2), which is obtained by differentiating the formula (1) with respect to a temperature T.

$$\partial\lambda/\partial T = 2\{(\partial n/\partial T)\Lambda + n(\partial\Lambda/\partial T)\} = 2\Lambda\{(\partial n/\partial T) + n(\partial\Lambda/\partial T)/\Lambda\} \quad \text{(Formula 2)}$$

The second term of the right side of the formula (2), $(\partial\Lambda/\partial T)/\Lambda$, corresponds to a thermal expansion coefficient of an optical fiber, and the value thereof is almost $0.6\times10^{-6}/°C$. On the other hand, the first term of the right side is a temperature dependency of a refractive index in a core portion of an optical fiber, the value thereof is almost $7.5\times10^{-6}/°C$. That is, while the temperature dependency of a center reflective wavelength is dependent on both of a change in refractive index in a core portion and a change in spacing of the grating due to thermal expansion, most of a change in center reflective wavelength is found to be caused by a change in refractive index according to temperature.

As means for preventing a change in center reflective wavelength, a method has been known in which a tension adapted to a change in temperature is applied to an FBG to vary a spacing of a grating region, thereby canceling a component caused by a change in refractive index.

As a specific example, a device controlled with respect to a tension therein is disclosed in the Japanese Patent Laid Open No. 2000-503967, which device is fabricated this way: an FBG applied with a prescribed tension is fixed with an adhesive onto a glass-ceramic substrate having a negative thermal expansion coefficient, which is obtained by crystallizing a mother glass body molded into a plate in advance.

In the above device, the substrate shrinks with a rise in temperature, which reduces an applied tension in the grating region of an optical fiber. On the other hand, with a fall in temperature, the substrate stretches to increase an applied tension in the grating region of an optical fiber. In such a way, a tension applied to an FBG is caused to change according to a change in temperature to thereby enable a spacing of the grating in the grating region to be adjusted, with the result that a temperature dependency of a center reflective wavelength can be cancelled. It is also disclosed that while, in an optical communication device with such a substrate, glass, polymer or metal can be used for adhesion and fixing of FBG, polymer, especially, an epoxy resin adhesive, is suitable for fabrication of the device with a high efficiency.

Furthermore, in Japanese Patent Laid Open No. 2000-503967, the reason why this glass-ceramic substrate has a negative thermal expansion coefficient is described below.

Not only does the glass-ceramic substrate have a microcrack, but also includes a crystalline phase ($\beta$-eucryptite solid solution) having a large negative thermal expansion coefficient along the c axis direction and a positive thermal expansion coefficient along the a axis direction. Additionally, the crystalline phase shrinks at the time of cooling along the a axis direction of a crystalline phase, but the shrinkage of the glass-ceramic substrate at the time of cooling is suppressed since clearances in the microcracks grow. On the other hand, the crystalline phase expands at the time of cooling along the c axis direction of the crystalline phase with no respect to microcracks. As a result, the glass-ceramic substrate has a negative thermal expansion coefficient because of a small contribution of a positive thermal expansion coefficient along the a axis direction and a large contribution of a negative thermal coefficient along the c axis direction.

A problem has remained that the glass-ceramics substrate has, however, a large hysteresis in thermal expansion which causes a hysteresis of a center reflective wavelength of an FBG to be large, with the result of a great change in center reflective wavelength of an FBG according to a change in temperature. Note that a hysteresis in thermal expansion shows a phenomenon that non-coincidence arises between behaviors in the courses of a rise and fall in temperature where a material stretches and shrinks according to a change in temperature.

Contrast to this, a method is disclosed in Japanese Patent Laid Open No. 2000-503967, in which a heat cycle treatment is performed at a temperature of 400 to 800° C. in order to reduce a hysteresis in thermal expansion of a glass-ceramic substrate to stabilize an internal structure, whereas a hysteresis in thermal expansion reduced in such a method is still unstable to changes in environment such as temperature and humidity and an initial value is difficult to be maintained. Additionally, such a heat treatment causes a fabrication process to be complex, thereby leading to a problem to increase in cost.

In WO 01/04672, a disclosure is given in which if a athermal member that is made of a polycrystalline body (ceramic made of a sintered body of powder) having a major crystal of β-quartz solid solution or β-eucryptite solid solution, a spacing between crystal planes thereof that gives a major diffraction peak in X ray diffraction measurement being smaller than 3.52 Å and a negative thermal expansion coefficient is used as a substrate of an FBG, not only can a temperature dependency of a center reflective wavelength of the FBG be suppressed, but a hysteresis in thermal expansion is also reduced. Note that since this ceramic has clearances in grain boundaries in the interior thereof and further has β-quartz solid solution or β-eucryptite solid solution showing a behavior of anisotropic thermal expansion, the ceramic has a negative thermal expansion coefficient due to a mechanism similar to the above glass-ceramics.

However, when a device using the above glass-ceramic or ceramic as a substrate exposed to a high temperature and high humidity environmental atmosphere for a long period, they absorbs water into the interior of a substrate, microcracks and clearances in grain boundaries necessary for attaining a negative expansion characteristic are filled with a reaction product between water and a substrate, and as a result, a thermal expansion coefficient shifts toward a positive direction, which has led to a problem that a device from such a substrate is hard to maintain prescribed performance as the device.

Contrast to this, in Japanese Patent Laid Open No. 2000-327372, a disclosure is given in which a surface of a glass-ceramic substrate is coated with a solution containing a silane given by the following formula (5) to avoid water to put into contact with the substrate, thereby enabling solution of the above problem.

$$R^6 Si(OZ)_3 \ldots \quad (5)$$

wherein $R^6$ is a hydrocarbon group in which F atom may be contained and having 1 to 10 carbon atoms, and Z is a monovalent hydrocarbon group containing methyl or ethyl group.

In a wavelength division multiplex transmission optical communication system, more of light is required for being multiplexed in order to transmit more of information and while in company with this trend, a request has been made for further reducing temperature dependency of a center reflective wavelength of an FBG; and in coping with this request, even if a silane solution disclosed in Japanese Patent Laid Open No. 2000-327372 is used, a water repellency on a glass-ceramic substrate is still insufficient, a thermal expansion coefficient of the glass-ceramic substrate showing a negative thermal expansion varies, though, slightly if exposed to a high temperature and high humidity environmental atmosphere for a long period, which results in a problem of insufficient temperature dependency of a center reflective temperature of an FBG.

In a case where an optical component with a positive thermal expansion coefficient, for example an FBG, is fixed on an optical communication device substrate using an adhesive made of a polymer adhesive having high productive efficiency, especially, an epoxy resin, silicone resin, acrylic resin or the like, an adhesive force of a adhesive is reduced or no force thereof is exerted if the solution containing a silane of the formula (5) is employed as a treatment agent for the substrate, thereby disabling fixing of an optical component on the substrate in a stable manner.

SUMMARY OF THE INVENTION

The present invention has been made in light of the above circumstances and it is accordingly an object of the present invention to provide an optical communication device substrate, capable of performing a water repellency treatment in a short time, made of ceramic or glass-ceramic showing a negative thermal expansion, and with almost no change in thermal expansion coefficient even if exposed to a high temperature and high humidity atmosphere for a long period, thereby reducing a hysteresis in thermal expansion; and an optical communication device capable of strongly fixing an optical component onto the substrate even if a polymer adhesive is used.

The present inventors made clear a problem that since although a silane solution was easy to penetrate into the interior of a substrate, a polymerization rate was slow and the solution vaporized before reaching a sufficient level of polymerization, a film thickness necessary and sufficient for suppressing water penetration was unable to be obtained and water, though of a small amount, penetrated into the interior of the substrate, reducing an effect to suppress a change in thermal expansion coefficient, in light of which in order to attain sufficient repellency with the silane solution, a necessity existed for an increased number of silane treatments, which led to inefficiency; and then has further found that the above object was achieved by use of a solution containing at least one organic silicon compound selected from the group consisting of siloxane compounds and silazane compounds instead of the silane solution, leads to proposal of the present invention.

That is, an optical communication device substrate of the present invention is directed to an optical communication device substrate made of ceramic or glass-ceramic having a negative thermal expansion coefficient in the range of −10 to −120×10⁻⁷/° C. in a temperature range of −40 to 100° C., treated with a solution containing at least one organic silicon compound selected from the group consisting of siloxane compounds and silazane compounds.

An optical communication device of the present invention is directed to an optical communication device obtained by fixing an optical component having a positive thermal expansion coefficient onto a substrate made of ceramic or glass-ceramic having a negative thermal expansion coefficient in the range of −10 to −120×10⁻⁷/° C. in a temperature range of −40 to 100° C., wherein the substrate is treated by a solution containing at least one organic silicon compound selected from the group consisting of siloxane compounds and silazane compounds.

DESCRIPTION OF THE PREFERRED EMBODIMENTS

Since an optical communication device substrate of the present invention is a device substrate treated with a solution containing at least one organic silicon compound selected from the group consisting of siloxane compounds and silazane compounds, a thermal expansion coefficient of the substrate made of ceramic or glass-ceramic showing negative thermal expansion does not change even if exposed for a long period to a high temperature and high humidity atmosphere. That is, if a water repellency treatment is applied to the substrate using a solution containing at least one organic silicon compound selected from the group consisting of siloxane compounds and silazane compounds, the water repellency treatment can be applied in a short time and a sufficient coat layer can be obtained on a surface of the substrate to ensure high water repellency of the substrate in the entirety since a siloxane compound is easy to be resinified at the surface of the substrate and a silazane compound has a high reactivity with the substrate; therefore, even if the substrate is exposed to a high temperature and high humidity atmosphere for a long period, no water penetrates into the interior of the substrate and clearances therein required for negative thermal expansion have no chance to be filled with a reaction product between water and the substrate, which causes a thermal expansion coefficient to be stable, thereby enabling maintenance of a prescribed performance as a device.

An optical communication device substrate of the present invention also has an effect to reduce a hysteresis in thermal expansion. That is, if a substrate is applied with a solution containing at least one organic silicon compound selected from the group consisting of siloxane compounds and silazane compounds, a surface energy of a surface of the substrate decreases and at the time of cooling, a force to prevent microcracks or clearances in grain boundaries from widening is small, therefore a hysteresis in thermal expansion is hard to take place, thereby enabling suppression of a fluctuation in a center reflective wavelength due to a change in temperature.

It is preferable that if an optical communication device substrate of the present invention has a maximum change rate in dimension of 22 ppm or less at a temperature at which a difference between dimensions during a rise in temperature and during a fall in temperature is maximized in a temperature range of −40 to 100° C., a change in a center reflective wavelength of an optical communication device, that is an FBG, due to temperature is hard to take place.

Figure 2:
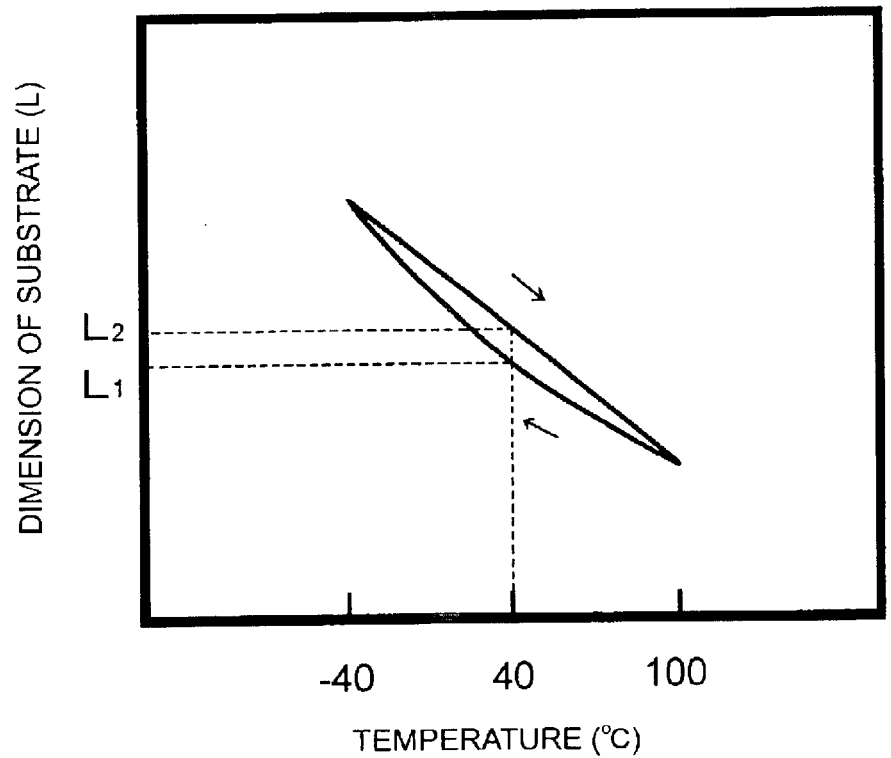
FIG. 2 is a graph showing a hysteresis in thermal expansion.

Note that a maximum change rate in dimension expresses a hysteresis in thermal expansion, and as described in FIG. 2, and shown by the following formula, it was obtained by dividing a difference between a dimension ($L_1$) of a substrate in a fall in temperature at 40° C. and a dimension ($L_2$) of the substrate in a rise in temperature at 40° C. by a dimension ($L_R$) of the substrate at a room temperature.

Maximum change rate in dimension (ppm)=$(|L_1-L_2|/L_R) \times 10^6$

A solution treating an optical communication device substrate of the present invention is preferably a solution containing at least one organic silicon compound selected from the group consisting of siloxane compounds and silazane compounds showing below.

Siloxane compounds are preferably organic silicon compounds given by the following general formula (1).

wherein $R^1$ is a monovalent hydrocarbon group, which may be the same as or different from each other, and having 3 to 20, preferably 4 to 10 carbon atoms, and to be concrete, any of propyl group, butyl group, hexyl group, octyl group, decyl group, dodecyl group, octadecyl group, phenyl group and others in the form of a straight chain or a branched chain. X is a monovalent hydrocarbon group, which may be the same as or different from each other, and having 1 to 10, preferably 1 to 5 carbon atoms, and to be concrete, any of methyl group, ethyl group and propyl group. Furthermore, a is a number of from 0 to 2 and b is a number of from 0 to 2, and a+b=(m+2)/m. In addition, m means the number of structural units in repetition and since m≧2, a siloxane compound of the formula (1) gives an oligomer made up of two or more monomer units. Siloxane compounds do not always have the respective same number of structural units in repetition, but may be a mixture of groups having the respective plural numbers of structural units in repetition, therefore m indicates an average of the numbers of structural units in repetition.

A siloxane compound of the formula (1) can be produced by hydrolytic condensation of an alkyltrialkoxy silane.

As another siloxane compound, there can be preferably exemplified an organic silicon compound given by the following general formula (2).

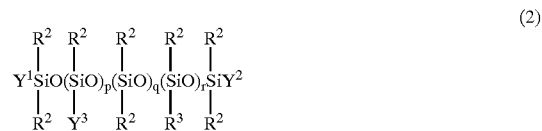

wherein $R^2$ is methyl group, and $R^3$ is a monovalent hydrocarbon group, which may be the same as or different from each other, and having 3 to 20 carbon atoms, and to be concrete, any of propyl group, octyl group, octadecyl group, phenyl group and others. Furthermore, $Y^1$, $Y^2$ and $Y^3$ are each $R^2$, $R^3$ or a group given by the following formula (3).

wherein A is an oxygen atom or a divalent hydrocarbon group having 2 to 10 carbon atoms, and as A, there can be exemplified ethylene group, propylene group and phenylene group, and among them, oxygen atom or ethylene group are preferable. $R^4$ is a monovalent hydrocarbon group having 1 to 10 carbons atoms and as $R^4$, there can be exemplified methyl group, ethyl group and propyl group. Furthermore, p is a number of from 0 to 5, q is a number of from 0 to 50 and r is a number of from 0 to 50. A siloxane compound of the formula (2) includes at least one group given by the formula (3) in one molecule.

As a silazane compound, there can be preferably exemplified an organic silicon compound given by the following general formula (4).

wherein $R^5$ is a monovalent hydrocarbon group, which may be the same as or different from each other, and having 3 to 20 carbon atoms, and to be concrete, any of propyl group, butyl group, hexyl group, octyl group, decyl group, dodecyl group, octadecyl group, phenyl group and others in the form of a straight chain or a branched chain.

A silazane compound of the formula (4) is a silazane oligomer obtained by a reaction between a corresponding halosilane (preferably, chlorosilane) and ammonia and desirably used as a solution in an organic solvent.

As solvents used for a siloxane compound, there are preferably exemplified solvents that can dissolve a siloxane compound therein: alcohol, ketone, ester, aromatic hydrocarbon, aliphatic hydrocarbon and others. Especially among them, preferably used are alcohols such as ethyl alcohol, isopropyl alcohol.

Since a silazane compound is strong in reactivity, as solvents used for a silazane compound, a non-aqueous solvent is used and there are preferably exemplified: especially, aromatic hydrocarbons such as toluene, xylene and aliphatic hydrocarbons such as hexane, octane, industrial gasoline.

An optical communication device substrate of the present invention is preferable if a siloxane compound or a silazane compound is adhered thereon at a 0.03 to 0.2 mass % since a thermal expansion coefficient of the substrate acquires almost no change therein even if exposed to a high temperature and high humidity atmosphere for a long time. That is, if an adhesion amount of a sloxane compound or a silazane compound is smaller than 0.03 mass %, a water repellency effect is poor but if in excess of 0.2 mass %, the siloxane compound or the silazane compound remains in a non-polymerized state and when exposed to a high temperature and high humidity atmosphere, the non-polymerized compound is polymerized, which unfavorably changes a thermal expansion coefficient of the substrate.

An adhesion amount of a siloxane compound or a silazane compound on an optical communication device substrate of the present invention can be adjusted in the range of 0.03 to 0.2 mass % in a procedure in which ceramic or glass-ceramic having a negative thermal expansion coefficient in the range of $-10$ to $-120 \times 10^{-7}/°$ C. in a temperature range of $-40$ to $100°$ C. is treated by a solution containing at least one organic silicon compound selected from the group consisting of siloxane compounds and silazane compounds and the interior of the substrate is cleaned with an organic solvent.

Note that while alcohol, toluene, xylene and others as an organic solvent can be used, IPA (isopropyl alcohol) is preferred in consideration of a working environment.

While there is no specific limitation on a concentration of a solution, a concentration is preferably in the range of 2 to 30 mass %. Since an optical communication device substrate of the present invention is applied, as a water repellency treatment solution for an optical communication device substrate, with a solution which contains at least one organic silicon compound selected from the group consisting of siloxane compounds given by the formulae (1) and (2) and silazane compounds given by the formula (4), when an optical component having a positive thermal expansion coefficient is adhesion-fixed thereon with a polymer adhesive with high device productive efficiency, especially an epoxy adhesive, wetting of the adhesive onto a surface of the substrate is improved and adhesion is subjected to neither separation nor looseness, thereby preferably obtaining a high adhesion strength since surface energies of functional groups of the siloxane or silazane compounds are almost the same as a polymer adhesive, especially an epoxy adhesive.

Note that a wetting property of an adhesive to a substrate surface can be evaluated by a contact angle and if a contact angle is in the range of $10°$ to $45°$, an adhesive is not separated or loosened but can attain a strong adhesion, therefore a loss or degradation of a function of athermalization is hard to be invited.

A substrate used in the present invention is ceramic or glass-ceramic having a major crystal of β-quartz solid solution or β-eucryotite solid solution, or alternatively polycrystalline ceramic having a major crystal of phosphotungstate or tungstate including at least Zr or Hf. Especially, if a substrate is made of ceramic or glass-ceramic having a major crystal of β-quartz solid solution or β-eucryotite solution, the substrate is preferably good in machinability.

If a substrate used in the present invention is made of a powder sintered body, a surface roughness thereof is preferably easy to be adjusted so as to be advantageous in adhesion of an optical component thereon without degrading a mechanical strength by changing particle diameters and a sintering condition of powder in use.

As polymer adhesives used in the present invention, an epoxy adhesive is preferable, but in addition, a silicon adhesive or an acrylic adhesive can be used.

Detailed description will be given of the present invention on the basis of examples below.

Figure 1:
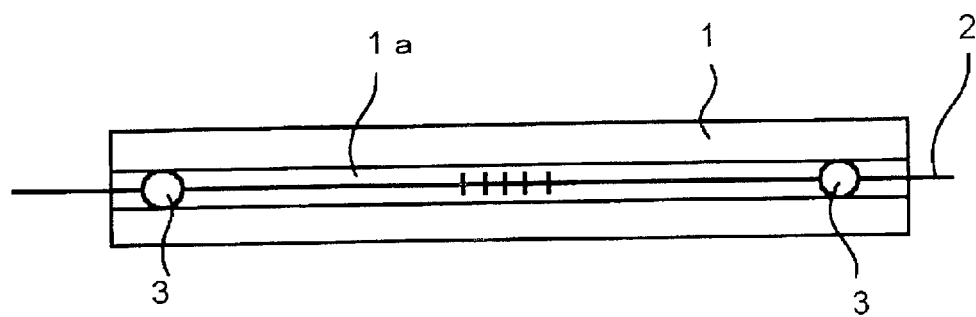
FIG. 1 is a plane view showing an optical communication device of examples in the present invention.
Figure 3:
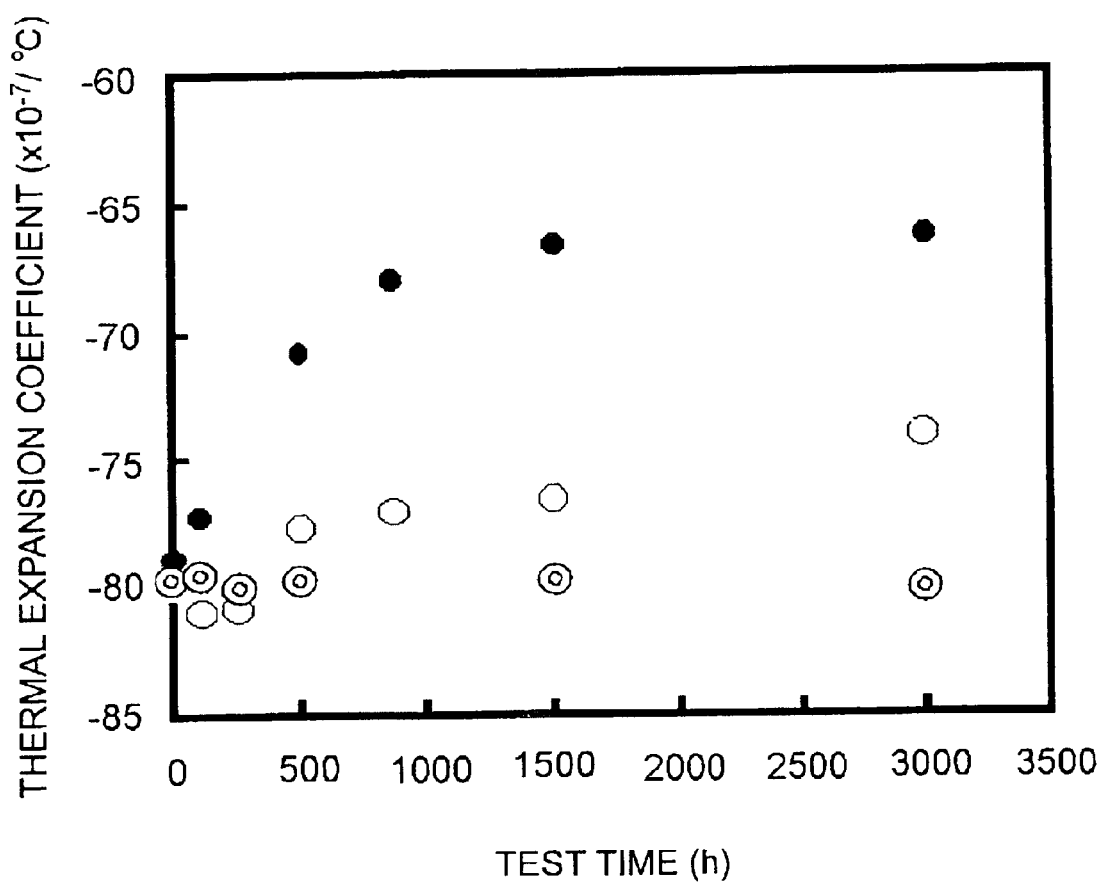
FIG. 3 is a graph showing results of long term endurance tests.

In Tables 1 and 2, there are shown Examples 1 to 10 of the present invention. In Table 3, there are shown Comparative examples 1 to 3. FIG. 1 is a plane view showing an optical communication device of examples in the present invention, FIG. 2 is a graph showing a change in dimension of a substrate during a rise in temperature and during a fall in temperature, that is a hysteresis in thermal expansion, and FIG. 3 is a graph showing results of long term endurance tests.

TABLE 1

|  | Ex. 1 | Ex. 2 | Ex. 3 | Ex. 4 | Ex. 5 |
|---|---|---|---|---|---|
| Organic Silicon Compound |  |  |  |  |  |
| General Formula | (1) | (1) | (1) | (1) | (4) |
| $R^1$ | $C_6H_{13}$ | $C_6H_{13}$ | $C_{10}H_{21}$ | $C_{18}H_{37}$ | — |
| $R^5$ | — | — | — | — | $C_{10}H_{21}$ |
| a | 0.07 | 0.08 | 0.06 | 0.03 | — |
| b | 1.88 | 1.75 | 1.71 | 1.74 | — |
| m | 2.1 | 2.4 | 2.6 | 2.6 | — |
| X | $CH_3$ | $CH_3$ | $C_2H_5$ | $CH_3$ | — |
| Concentration (mass %) | 10 | 10 | 10 | 5 | 5 |
| Solvent | IPA | IPA | IPA | Toluene | IPA |
| Thermal Expansion Coefficient of Substrate ($\times 10^{-7}/°$ C.) |  |  |  |  |  |
| Before Long Term Endurance Test | −80 | −80 | −80 | −80 | −80 |
| After Long Term Endurance Test | −79 | −80 | −79 | −80 | −80 |
| Maximum Change Rate in Dimension (ppm) | 15 | 12 | 15 | 18 | 15 |
| Contact Angle of Adhesive (°) | 34 | 36 | 35 | 29 | 38 |
| Peel Strength of FBG | Very Large | Very Large | Very Large | Very Large | Very Large |
| Cleaning Agent | IPA | IPA | IPA | IPA | Toluene |
| Adhesion Amount (mass %) | 0.05 | 0.04 | 0.08 | 0.10 | 0.07 |

TABLE 2

|  | Ex. 6 | Ex. 7 | Ex. 8 | Ex. 9 | Ex. 10 |
|---|---|---|---|---|---|
| Organic Silicon Compound |  |  |  |  |  |
| General Formula | (2) | (2) | (2) | (2) | (2) |
| $R^2$ | $CH_3$ | $CH_3$ | $CH_3$ | $CH_3$ | $CH_3$ |
| $R^3$ | — | — | — | — | $C_8H_{17}$ |
| $R^4$ | $CH_3$ | $CH_3$ | $CH_3$ | $CH_3$ | $CH_3$ |
| $Y^1$ | $CH_3$ | (3) | (3) | (3) | $CH_3$ |
| $Y^2$ | $CH_3$ | (3) | (3) | $CH_3$ | $CH_3$ |
| $Y^3$ | (3) | — | — | — | (3) |
| A | $C_2H_4$ | $C_2H_4$ | $C_2H_4$ | O | $C_2H_4$ |
| p | 1 | 0 | 0 | 0 | 2 |
| q | 0 | 4 | 8 | 9 | 10 |
| r | 0 | 0 | 0 | 0 | 10 |

TABLE 2-continued

|  | Ex. 6 | Ex. 7 | Ex. 8 | Ex. 9 | Ex. 10 |
| --- | --- | --- | --- | --- | --- |
| Concentration (mass %) | 10 | 10 | 10 | 10 | 10 |
| Solvent | IPA | IPA | IPA | IPA | IPA |
| Thermal Expansion Coefficient of Substrate ($\times 10^{-7}/^\circ$ C.) | | | | | |
| Before Long Term Endurance Test | −80 | −80 | −80 | −80 | −80 |
| After Long Term Endurance Test | −79 | −78 | −79 | −80 | −80 |
| Maximum Change Rate in Dimension (ppm) | 15 | 19 | 20 | 18 | 22 |
| Contact Angle of Adhesive (°) | 39 | 42 | 40 | 41 | 43 |
| Peel Strength of FBG | Large | Large | Large | Large | Large |
| Cleaning Agent | IPA | IPA | IPA | IPA | IPA |
| Adhesion Amount (mass %) | 0.08 | 0.09 | 0.09 | 0.13 | 0.16 |

TABLE 3

|  | Comp. Ex. 1 | Comp. Ex. 2 | Comp. Ex. 3 |
| --- | --- | --- | --- |
| Organic Silicon Compound | | | |
| General Formula | (5) | (5) | |
| $R^6$ | $C_{10}H_{21}$ | $C_6F_5-C_3H_6$ | No Treatment |
| Z | $CH_3$ | $CH_3$ | |
| Concentration (mass %) | 10 | 10 | |
| Solvent | IPA | IPA | — |
| Thermal Expansion Coefficient of Substrate ($\times 10^{-7}/^\circ$ C.) | | | |
| Before Long Term Endurance Test | −80 | −80 | −80 |
| After Long Term Endurance Test | −75 | −76 | −71 |
| Maximum Change Rate in Dimension (ppm) | 26 | 24 | 23 |
| Contact Angle of Adhesive (°) | 33 | 70 | 33 |
| Peel Strength of FBG | Large | None | Large |
| Cleaning Agent | No Cleaning | No Cleaning | — |
| Adhesion Amount (mass %) | 0.02 | 0.02 | — |

EXAMPLES

At first, substrates 1 were prepared each of which was made of ceramic (ceramic made of powder sintered body) of β-quartz solid solution and has dimensions of 40 mm in length, 4 mm in width and 3 mm in thickness. A slit 1a of 0.6 mm in depth was formed on an upper surface thereacross. The substrates 1 were immersed in solutions containing respective siloxane compounds shown in Tables 1 and 2 and applied with supersonic vibration for 10 minutes. Thereafter, the substrates 1 were dried at 100° C. for 10 to 30 minutes and immersed in a cleaning agent, followed by supersonic cleaning for 10 minutes.

Then, FBG2 was inserted in the slit 1a on each of the substrates 1 applied with a water repellency treatment, and FBG 2 and the substrate 1 was adhesion-fixed to each other at two points in the vicinities of respective both ends of the substrate 1 using Epoxy adhesive 3 (XOC-02THK made by KYORITSU CHEMICAL & CO., LTD.), thereby fabricating an optical communication device 10 for each of the examples 1 to 10 (FIG. 1). Note that adhesion between FBG2 and the substrate 1 were effected by curing an adhesive in a procedure in which a metal halide lamp having an output of 3500 mW/cm² was used and the adhesive between FBG2 and the substrate 1 was irradiated with ultraviolet (UV) of 300 to 400 nm in wavelength for 2 seconds, followed by a heat treatment at 100° C. for 5 minutes.

Comparative Examples

An optical communication device of Comparative Example 1 was fabricated in a similar manner to the examples except that an alkyl silane solution was used as a treatment solution and no cleaning with a cleaning agent was performed. An optical communication device of Comparative Example 2 was fabricated in a similar manner to Comparative Example 1 except that a fluorosilane solution was used as a treatment solution. An optical communication device of Comparative Example 3 was fabricated in a similar manner to the examples except that neither a water repellency treatment nor cleaning was applied. In Comparative Examples 1 and 2, however, substrates 1 were immersed in respective solutions and supersonic vibration was given thereto, followed by drying at 100° C. for 60 to 120 minutes.

The optical communication devices of the examples and the comparative examples thus fabricated were evaluated on characteristics thereof and results of the evaluation are shown in Tables 1 to 3.

Thermal expansion coefficients and maximum change rates in dimension were measured with a dilatometer (made by MAC Science Co., Ltd.) in a temperature range of −40 to 100° C. at rise and fall rates in temperature of 1° C. per minute.

A crystalline phase was identified with an X ray diffractometer and a contact angle was measured with a contact angle meter (made by KYOWA INTERFACE SCIENCE CO., LTD.) on a liquid drop of 0.5 cm³ of an epoxy adhesive formed on a substrate 1 surface. A long term endurance test and evaluation thereof were performed in a procedure in which a substrate 1 is left in a high temperature and high humidity atmosphere at 75° C. and 90% for 500 hours and a thermal expansion coefficient was measured before and after the test. Especially in Example 2, a substrate 1 was left in the high temperature and high humidity atmosphere for 3000 hours under the above conditions to measure and evaluate a thermal expansion coefficient of the substrate 1. A peel test on an FBG 2 was performed in a procedure in which an FBG 2 after a water repellency treatment was fixed with an epoxy adhesive on a substrate 1 and then the FBG 2 and the substrate 1 were pulled from each other to measure a peel strength.

An adhesion amount of a siloxane compound or silazane compound was obtained from a change between mass values of a substrate 1 before a water repellency treatment and after cleaning and an adhesion amount of a silane compound was obtained from a change between mass values of a substrate 1 before a water repellency treatment and after drying.

As is clear from Tables 1 and 2, in the optical communication devices of Examples 1 to 10, changes are small between thermal expansion coefficients of the substrates before and after the long term endurance test, and hystereses are suppressed. Furthermore, as shown in FIG. 3, since even when the optical communication device of Example 1 was exposed to the high temperature and high humidity atmosphere for 3000 hours, a change in a thermal expansion coefficient of the substrate in the long term endurance test was small (⊙ marks), there was no chance to cause a function of athermalization to be lost or degraded and there was exhibited a characteristic with high long term reliability as an optical communication device. Furthermore, it was confirmed that the other examples showed similar profiles to those of ⊙ marks of FIG. 3. Note that as shown in FIG. 3, in the long term endurance tests on substrates (● marks) not applied with a water repellency treatment, a change in thermal expansion coefficient in each example was very large.

Values of a contact angle of an adhesive on substrates of Examples 1 to 10 show values as low as 45° or lower and good levels of wetting to the substrates, and as is understood from Tables 1 and 2, a peel strength of an FBG was high and there was no chance of separation and loosening of an applied adhesive in any of the examples.

On the other hand, as shown in Table 3, since Comparative Examples 1 and 2 used the silane solutions, a change between thermal expansion coefficients of a substrate before and after the long term endurance test was large in each case. In Comparative Example 3, since no water repellency treatment was applied, a change between thermal expansion coefficients of a substrate before and after the long term endurance test was large. In the long term endurance test on Comparative Example 2 (○ marks), a change in thermal expansion coefficient of the substrate was recognized. From the results, there is a fear of loss or degradation of a function of athermalization as an optical communication device because of a change in thermal expansion coefficient when exposed to a high temperature and high humidity atmosphere. Furthermore, since a contact angle of an adhesive on a substrate surface was as large as 70°, poor wetting of the adhesive, so it was impossible to fix an FBG using an adhesive and a peel strength of an FBG was equal to almost zero.

As described above, since a substrate is treated by a solution containing at least one organic silicon compound selected from the group consisting of siloxane compounds and silazane compounds, a water repellency treatment on a surface of a substrate can be performed in a comparative short time, a substrate of an optical communication device has no chance to change a thermal expansion coefficient even if exposed to a high temperature and high humidity atmosphere for a long term and a hysteresis in thermal expansion is suppressed. Furthermore, with a high adhesion strength to a polymer adhesive, especially an epoxy adhesive, FBG can be stably fixed on a substrate.

What is claimed is:

1. An optical communication device substrate made of ceramic or glass-ceramic having a negative thermal expansion coefficient in the range of −10 to −120×10⁻⁷/° C. in a temperature range of −40 to 100° C., treated with a solution containing at least one organic silicon compound selected from the group consisting of siloxane compounds and silazane compounds.

2. The optical communication device substrate according to claim 1, having a maximum change rate in dimension of 22 ppm or less at a temperature at which a difference between dimensions during a rise in temperature and during a fall in temperature is maximized in a temperature range of −40 to 100° C.

3. The optical communication device substrate according to claim 1, wherein the siloxane compound is an organic silicon compound represented by the following general formula (1)

$$\{R^1Si(OH)_a(OX)_bO_{(m-1/m)}\}_m \qquad (1)$$

wherein $R^1$ is a monovalent hydrocarbon group, which may be the same as or different from each other, and having 3 to 20 carbon atoms, X is a monovalent hydrocarbon group, which may be the same as or different from each other, and having 1 to 10 carbon atoms, and a is a number of from 0 to 2 and b is a number of from 0 to 2, providing that a+b=(m+2)/m wherein m 2.

4. The optical communication device substrate according to claim 1, wherein the siloxane compound is an organic silicon represented by the following general formula (2)

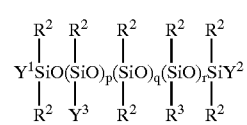
(2)

wherein $R^2$ is a methyl group, $R^3$ is a monovalent hydrocarbon group, which may be the same as or different from each other, and having 3 to 20 carbon atoms and $Y^1$, $Y^2$ and $Y^3$ are each $R^2$, $R^3$ or a group represented by the following formula (3)

$$\text{-A-Si}(OR^4)_3 \ldots \qquad (3)$$

wherein A is an oxygen atom or a divalent hydrocarbon group having 2 to 10 carbon atoms, and $R^4$ is a monovalent hydrocarbon group having 1 to 10 carbons atoms, p is a number of from 0 to 5, q is a number of from 0 to 50 and r is a number of from 0 to 50 and the siloxane compound of formula (2) includes at least one group represented by formula (3) in one molecule.

5. The optical communication device substrate according to claim 1, wherein the silazane compound is an organic silicon compound given by the following general formula (4)

$$R^5Si(NH)_{3/2} \ldots \qquad (4)$$

wherein $R^5$ is a monovalent hydrocarbon group, which may be the same as or different from each other, and having 3 to 20 carbon atoms.

6. The optical communication device substrate according to claim 1, wherein the adhesion amount of the siloxane compound or the silazane compound is 0.03 to 0.2 mass %.

7. A optical communication device obtained by fixing an optical component having a positive thermal expansion coefficient onto the optical communication device substrate according to claim 1.

8. The optical communication device according to claim 7, wherein the optical component having a positive thermal expansion coefficient is fixed on the optical communication device substrate using a polymer adhesive.

9. The optical communication device according to claim 8, wherein the polymer adhesive is one type of an adhesive selected from epoxy resin, silicone resin and acrylic resin.

* * * * *

UNITED STATES PATENT AND TRADEMARK OFFICE
CERTIFICATE OF CORRECTION

PATENT NO. : 6,780,514 B2  
DATED : August 24, 2004  
INVENTOR(S) : Yoshihara et al.

Page 1 of 1

It is certified that error appears in the above-identified patent and that said Letters Patent is hereby corrected as shown below:

Column 5,  
Line 45, delete "$(|L^1\text{-}L_2|/L_R) \times 10^6$", and substitute therefore -- $(|L_1\text{-}L_2|/L_R) \times 10^6$ --.

Column 11,  
Line 45, please delete "$\{R^1Si(OH)_a(OX)_bO_{(m1/m\}m)}$", and substitute therefore -- $\{R^1Si(OH)_a(OX)_bO_{(m-1/m\}m}$ --; and Column 12,  
Line 8, please delete "m 2", and substitute therefore -- $m \geq 2$ --.

Signed and Sealed this

Fifth Day of April, 2005

JON W. DUDAS  
*Director of the United States Patent and Trademark Office*